March 30, 1948.  A. L. GRISÉ  2,438,698
LIQUID DISPENSING APPARATUS
Filed July 26, 1944  9 Sheets-Sheet 1
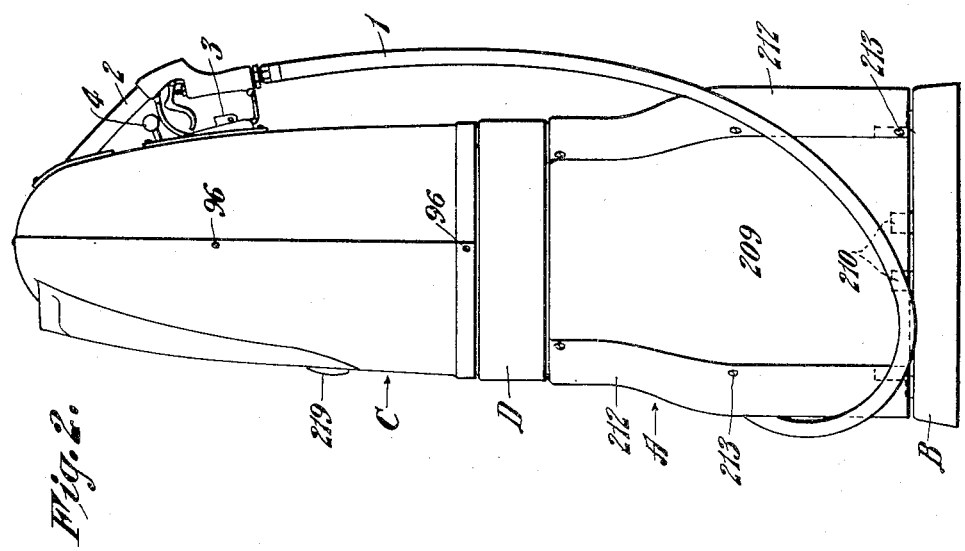
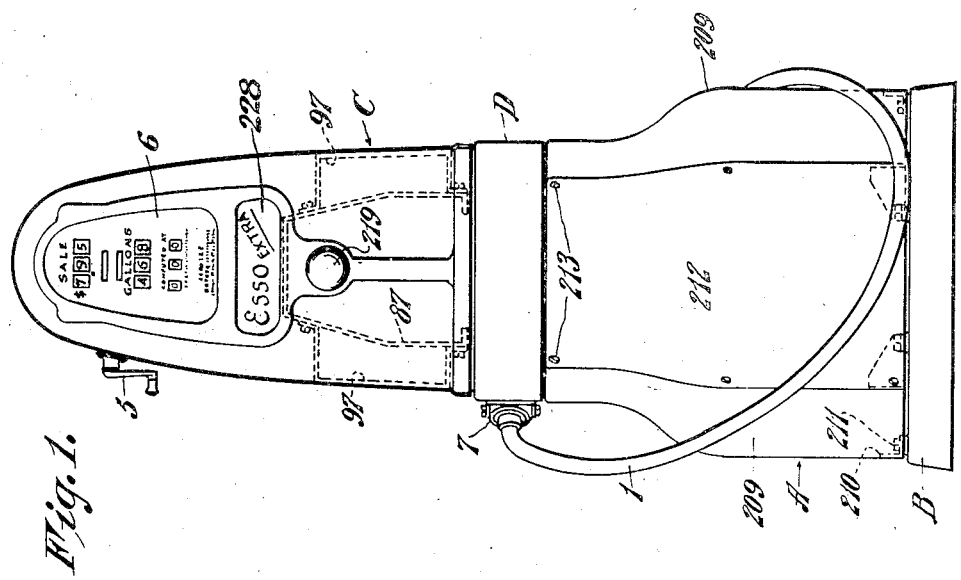
INVENTOR,
Alfred L. Grisé,
BY Chapin & Neal
ATTORNEYS March 30, 1948. A. L. GRISÉ 2,438,698
LIQUID DISPENSING APPARATUS
Filed July 26, 1944 9 Sheets-Sheet 2
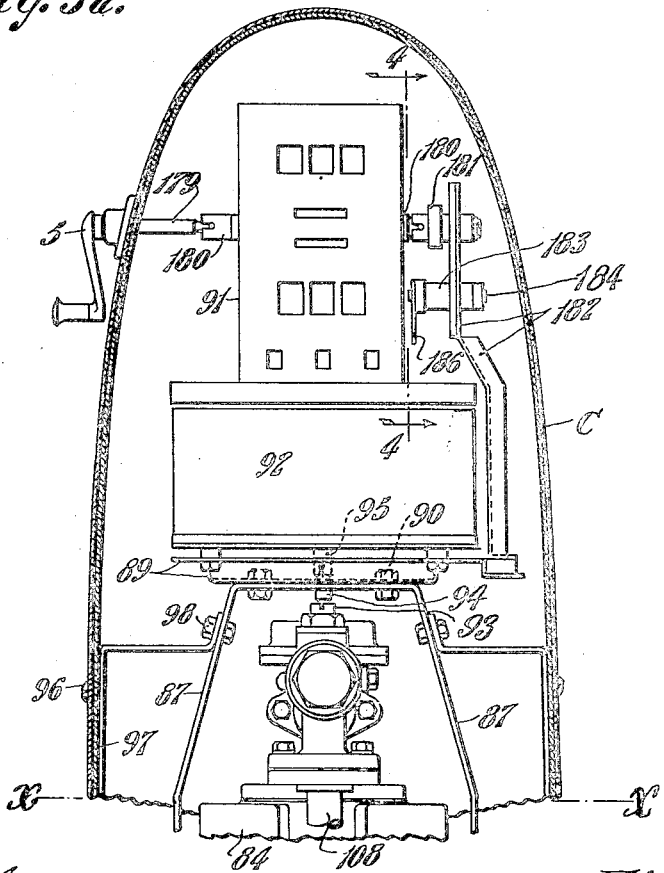
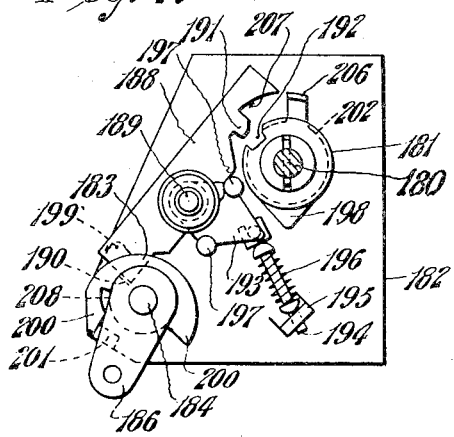
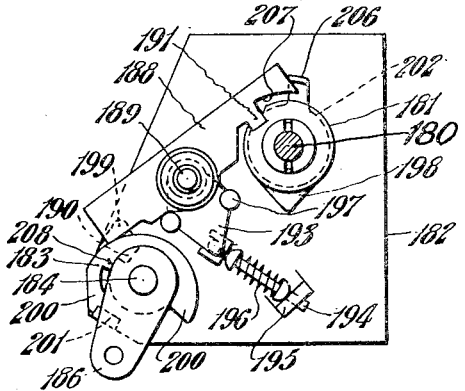
INVENTOR,
Alfred L. Grisé,
BY
Chapin & Neal
ATTORNEYS March 30, 1948.  A. L. GRISÉ  2,438,698

LIQUID DISPENSING APPARATUS

Filed July 26, 1944  9 Sheets-Sheet 4

INVENTOR,
Alfred L. Grisé,
BY Chapin & Neal
ATTORNEYS

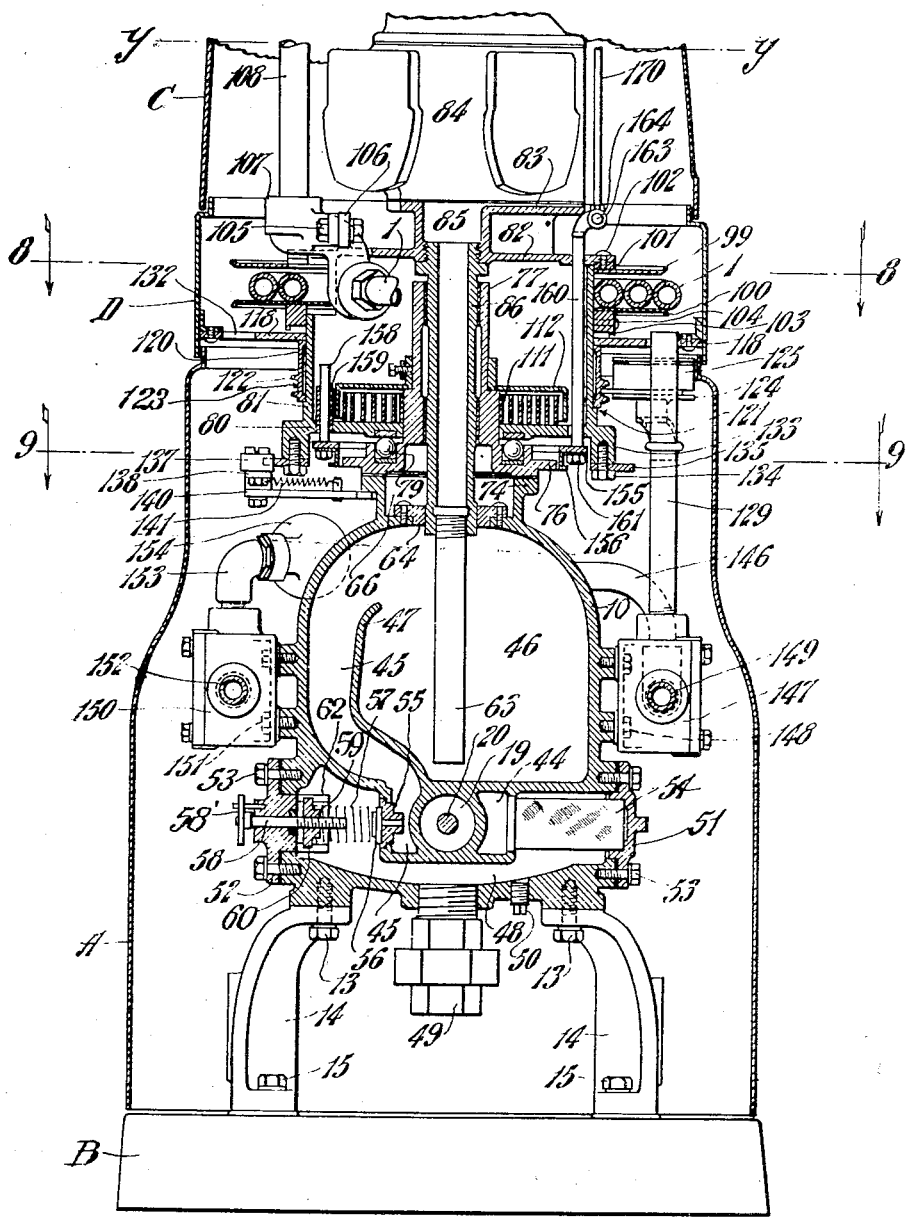

INVENTOR,
Alfred L. Grisé,
BY Chapin & Neal.
ATTORNEYS

March 30, 1948. A. L. GRISÉ 2,438,698
LIQUID DISPENSING APPARATUS
Filed July 26, 1944 9 Sheets-Sheet 7

INVENTOR,
Alfred L. Grisé,
BY Chapin + Neal
ATTORNEYS

March 30, 1948. A. L. GRISÉ 2,438,698
LIQUID DISPENSING APPARATUS
Filed July 26, 1944 9 Sheets-Sheet 8

INVENTOR,
Alfred L. Grisé,
BY Chapin + Neal
ATTORNEYS

March 30, 1948.                A. L. GRISÉ                2,438,698
                    LIQUID DISPENSING APPARATUS
              Filed July 26, 1944          9 Sheets-Sheet 9
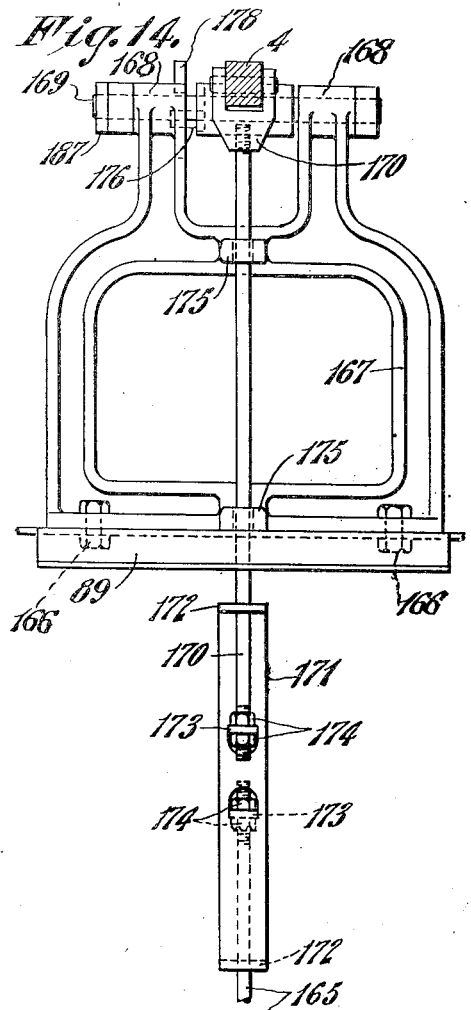
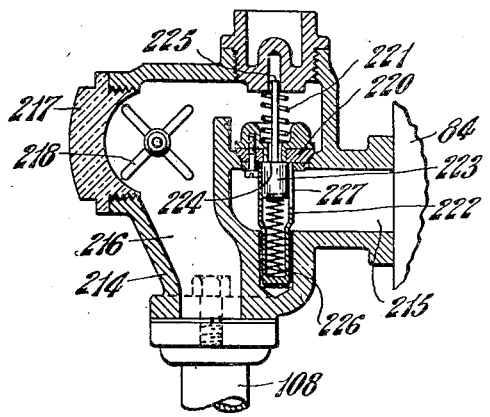
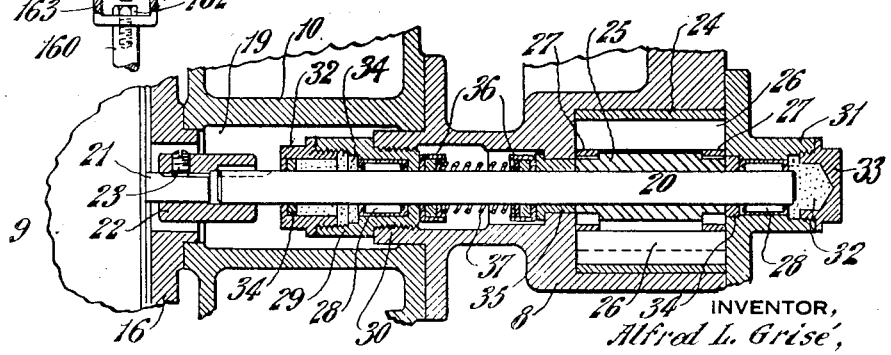
INVENTOR,
Alfred L. Grisé,
BY Chapin & Neal
ATTORNEYS Patented Mar. 30, 1948

2,438,698

UNITED STATES PATENT OFFICE 2,438,698

LIQUID DISPENSING APPARATUS

Alfred L. Grisé, Springfield, Mass., assignor to Gilbert & Barker Manufacturing Company, Springfield, Mass., a corporation of Massachusetts Application July 26, 1944, Serial No. 546,642

13 Claims. (Cl. 222—23)

This invention relates to improvements in liquid measuring and dispensing apparatus, such for example, as is customarily used for dispensing measured quantities of gasoline and the like at service stations.

The principal object of the invention is to provide in a dispensing apparatus of the class described, a mounting of the hose in the apparatus such as to yield an angular range of service of 360 degrees with extensibility of the hose from the casing of the apparatus, when necessary or desired, together with a register which shows the quantity and/or cost of the liquid dispensed, and which is rotatable by pulling on the hose to present the face of the register at any desired radial position for convenient reading.

The invention provides a solution for the difficulties which arise due to carelessness or thoughtlessness of drivers as to where they leave their cars with respect to the dispensing apparatus. The car may be left on the wrong side of the apparatus or facing the wrong way on the right side of the apparatus or it may be too close to the apparatus or too far from it. Wherever the car is left, the driver expects it to be serviced without inconvenience to himself and, at the same time, he wishes to be able to read the register without moving from his position and see how much gasoline he is getting. It is important for the operator to watch the register while filling the tank of the car. With the provisions of this invention, the operator can turn the register throughout a 360 degree range by pulling on the hose, whereby he can position the register so that he can watch it during filling and so that the customer can see it after the filling is completed. At the same time, the connection of the hose to the apparatus enables swivelling throughout a range of 360 degrees so that a car can be served from any angle and it also enables extension of the hose if and when necessary to reach a car left more than the normal distance from the apparatus.

More particularly, the invention has for an object the provision in an apparatus of the class described, of a turret carrying the register and mounted to turn about a vertical axis and a hose reel mounted on the turret to enable extension of the hose when required.

The invention has for another object to provide in apparatus of the class described, a casing having a stationary lower section for housing the motor, pump and separator of the apparatus, an upper section rotatable about a vertical axis and housing the register and meter, and an intermediate section rotatable about said axis independently of the upper section and housing the hose reel or other hose storage means.

The invention has for another object to provide in an apparatus of the kind described, a swivel connection between the stationary and rotatable parts of the gasoline discharge conduit such that stuffing boxes or seals are unnecessary to prevent leakage.

More particularly, it is an object of the invention to mount the turret of the apparatus on top of a standard, having therein an air separating chamber, and to have the meter inlet pipe rotatably mounted in the top wall of the standard and in the upper wall of the separating chamber, the clearance space between such pipe and upper wall functioning, in part at least, as the constantly-open small vent of the air separator, there being a vent chamber between said walls for receiving the fluids discharged through the vent of the separator and a drain connection from such chamber to the liquid-recovery chamber of the separator.

A further object of the invention is to provide in an apparatus of the kind described, an arrangement whereby the switch of the pump-driving motor, which switch is stationarily mounted in the apparatus, may be operated by a lever mounted on the rotatable part of the apparatus at any position which said rotatable part may assume.

These and other objects will best be understood as the detailed description proceeds.

The invention will be disclosed with reference to the accompanying drawings, in which, Figs. 1 and 2 are small-scale front and side elevational views, respectively, of a liquid dispensing apparatus embodying the invention;

Figs. 3a and 3b, when joined together on the lines x—x, give a sectional elevational view of the apparatus;

Figs. 4 and 5 are sectional views taken on the line 4—4 of Fig. 3a, showing the interlock between the motor switch and the register-resetting means, in switch-locking and switch-unlocking positions, respectively;

Figs. 6a and 6b, when joined together along the lines y—y, give a cross sectional view of the apparatus;

Fig. 7 is a top plan view of the unit which houses the registering mechanism, and shows the mounting of the switch-actuator and the interlock between the latter and the resetting means for the register;

Figs. 8 and 9 are sectional plan views taken on the lines 8—8 and 9—9, respectively, of Fig. 6b;

Fig. 14 is a fragmentary elevational view taken from the right of Fig. 6a showing the upper portion of the switch actuating means;

Fig. 15 is a sectional elevational view of the combined valve and visible discharge indicator; and Fig. 16 is a fragmentary sectional elevational view looking in the same direction as Fig. 3b but drawn to a larger scale and showing in detail the mounting of the driving shaft for the pump.

Figure 3B:
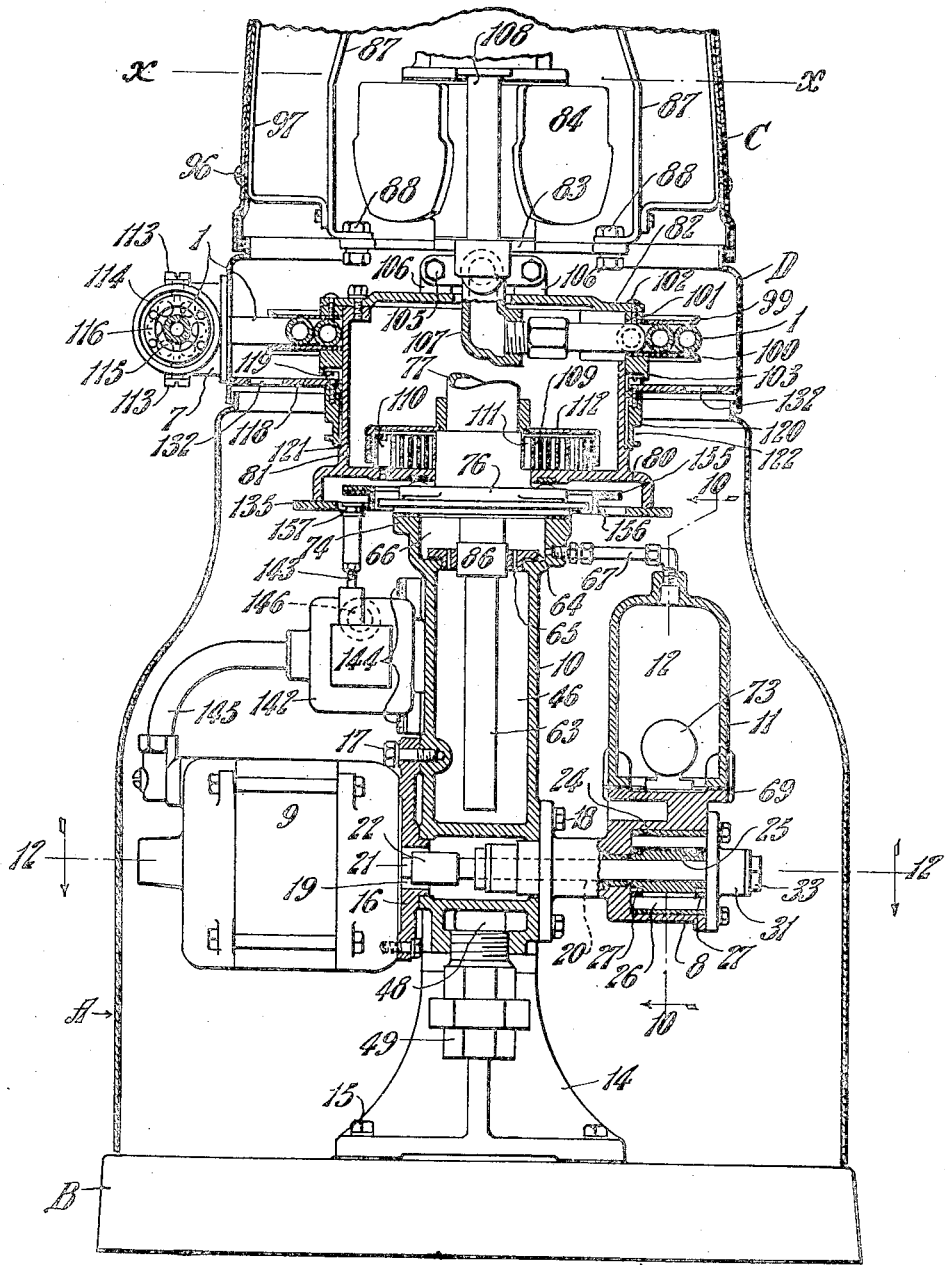

Referring to these drawings and first to Figs. 1 and 2 thereof, the dispensing and measuring apparatus, with the exception of the hose 1, its nozzle 2, a nozzle support 3, a switch-actuating lever 4 and a crank 5 for resetting the register, is enclosed within a casing having a lower section A, fixed to and upstanding from a base B, an upper section C and an intermediate section D. One novel feature of the apparatus is that a hose reel is located within the intermediate section D. Another feature is that the upper section C is rotatable about a vertical axis and carries the meter and the register, the indications of the latter being visible through a window 6. The intermediate section D is rotatable relatively to the hose reel and the upper section C, as well as to the lower section A. One may use the apparatus like any other standard form, a certain length of hose being available outside the pump casing for serving a car. Then, by pulling on the hose, the upper section C may be turned on its vertical axis to present the window 6 of the register at any desired angle throughout a range of 360 degrees for convenient reading. The first pull on the hose will turn the intermediate section D until the center line of its tangential outlet 7 is in line with the axis of the taut section of the hose. A further pull on the hose will turn the casing C and the register in the desired direction. If additional hose is required in order to serve the car, continued pulling on the hose will turn the reel by one or more revolutions, as required, and unwind the needed extra hose. On release of the hose, the casings C and D are restored to their original positions.

Referring next to Fig. 3b, in the lower section A of the housing, is located, the pump 8, its driving motor 9, an air separator 10 and a casing 11 which is associated with the separator and provides a liquid-recovery chamber 12. The separator consists of a box-like casting, fixed as by cap screws 13 (Fig. 6b) to two legs 14, which in turn are fastened to base B by cap screws 15. The motor 9 is fixed, as indicated in Fig. 3b, to a plate 16 which is secured by cap screws 17 to one side wall of separator 10 near the lower part thereof. The pump casing 8 is fixed by cap screws 18 to the opposite side wall of the separator. Extending through the lower part of the separator is a cylindrical opening 19 which receives the drive shaft 20 of the pump and the aligned shaft 21 of the motor, such shafts being connected by a suitable coupling 22. The latter, as best shown in Fig. 16, is fixed to shaft 21 by a set screw 23 and is slidably keyed to shaft 20. Thus either the motor 9 or the pump 8 or both may be easily removed and replaced since the coupling 22 and shaft 20 are connectible and disconnectible merely by an axial thrust or an axial pull.

Figure 10:
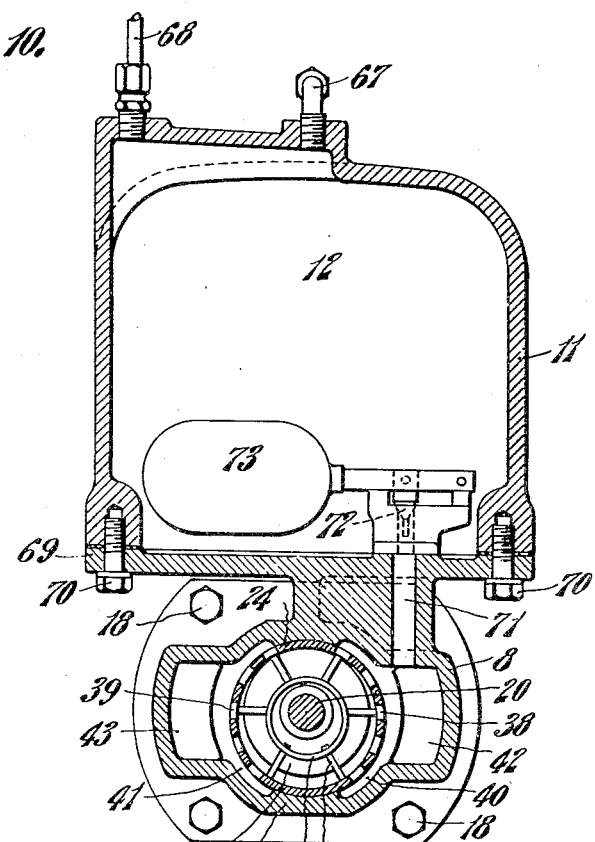
Fig. 10 is a cross sectional view taken on line 10—10 of Fig. 3b, showing the pump and the liquid-recovery chamber of the air separator.
Figure 12:
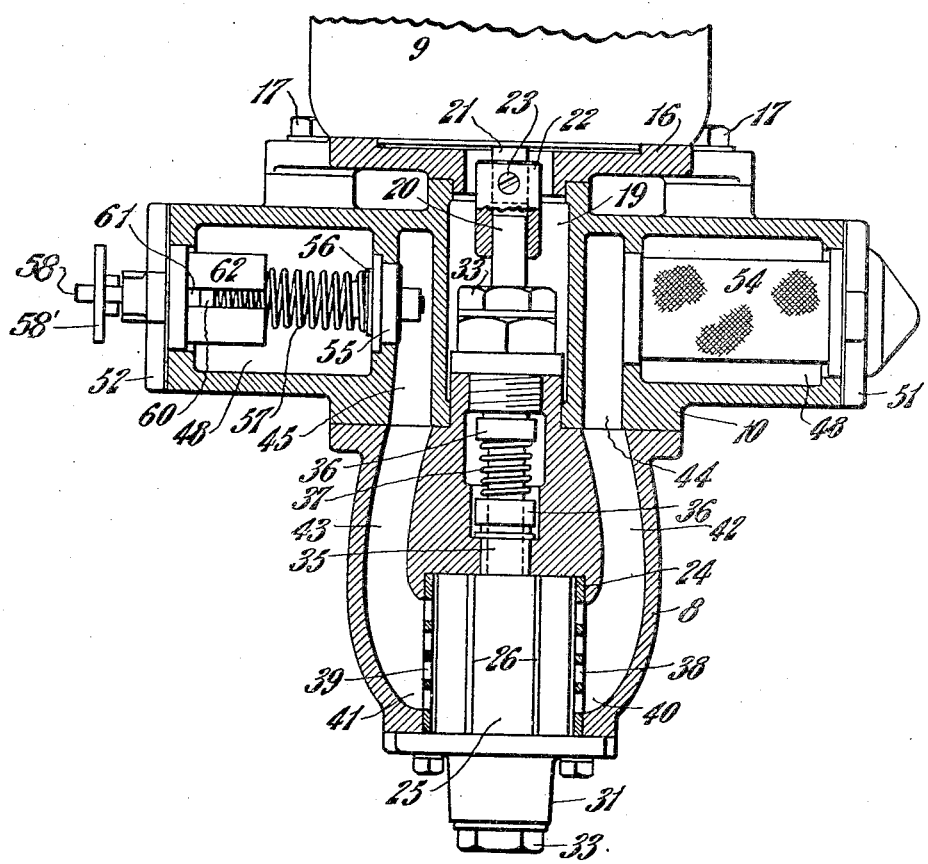
Fig. 12 is a sectional plan view taken on the line 12—12 of Fig. 3b.

The pump (Figs. 10 and 12) has a stator including a sleeve-like liner 24, fixed in the outer part of casing 8 eccentrically of shaft 20, and a rotor 25, fixed to said shaft and provided with a plurality (six as shown) of radially slidable blades 26, equally spaced about the rotor in a circular series. The rotor 25 and the liner 24 are preferably made of "Catalin," a plastic material, and the blades are made of carbon. This assures quiet operation of the pump at high speeds. The ends of the rotor (Fig. 16) are recessed to receive, one in each, a pair of annular rings 27, which maintain the outer edges of the blades slidably engaged with the internal periphery of the liner 24. The pump shaft 20 (Fig. 16) is supported by inner and outer needle bearings 28, provided one in a body 29, screwed into the pilot hub 30 of the pump casing 8, and the other in a cap 31, fixed to and closing the outer end of the pump body. A grease chamber 32 is provided for each needle bearing in a removable cap 33 and escape of grease is prevented by felt washers 34. Adjacent the inner end of the pump rotor, the shaft passes loosely through a bushing 35, the flange of which provides a seat for a seal ring 36. Another and similar seal ring 36 seats against the end face of body 29. These seal rings revolve with shaft 20 and are pressed apart and against their seats by a spring 37. The seal rings provide a double check against escape of gasoline from the pump 8 along its shaft 20.

The pump stator 24 (Fig. 10) is respectively provided with inlet and outlet openings 38 and 39 therethrough, leading to inlet and outlet ports 40 and 41, respectively. The ports 40 and 41 respectively communicate with the outer ends of longitudinal passages 42 and 43 which at their inner ends, respectively communicate with chambers 44 and 45, (Fig. 12) formed in separator casting 10, one on each side of the central passage 19. The chamber 45 (Fig. 6b) extends upwardly into the separator chamber 46, being separated therefrom by a dam 47. An inlet chamber 48 is formed in the base of the separator 10, underlying the passage 19, and having its ends extending upwardly one outside chamber 44 and one outside chamber 45. A suction pipe, shown in part at 49, is connected at one end to the central and lower part of chamber 48 and its other end is adapted for connection to a low-level supply tank, containing the liquid such as gasoline, to be dispensed. A drain plug 50 is also provided in the bottom wall of chamber 48. The otherwise open ends of chamber 48 are closed by cover plates 51 and 52 held in place by cap screws 53.

In the outer end wall of chamber 44 (Figs. 6b and 12) is an opening which closely fits the inner end of a filter screen 54 and the outer end of which fits into and is closed by a seat in cover 51. Liquid entering chamber 48 passes through the peripheral wall of screen 54 into the interior thereof and thence into chamber 44, passage 42, port 40 and holes 38 into the pump. Liquid leaves the pump through holes 39, port 41, passage 43, chamber 45, and up over the top of dam 47 into the separator chamber 46.

Fixed in the lower portion of the outer wall of chamber 45 (Fig. 6b) is a member 55 affording a seat for a by-pass valve 56, which is held to its seat by a spring 57. The tension of this spring is adjustable by turning a shaft 58. This shaft is mounted in the cover 52 and has a threaded inner end which is engaged in a nut 59. The latter is held against turning by lugs 60 (Fig. 12) which are engaged, one in each of two slots 61 formed in a sleeve 62, fixed to the inner face of cover 52. The shaft 58 has a hand wheel 58' fixed thereto. When liquid in the outlet chamber 45 exceeds a predetermined pressure, valve 56 will open and allow liquid to by-pass to inlet chamber 48 and thus to the suction side of the pump.

The air separator chamber 46 (Fig. 6b) has an outlet pipe 63 for air-free liquid. This pipe leads upwardly from a point near the bottom of the chamber 46 and extends through a cover plate 64, secured as indicated, to the top wall of casing 10. In this cover, 64 (Fig. 3b) which forms the upper wall of the separating chamber 46, are one or more holes 65, through which air and gases and liquid escape from the separating chamber into a vent chamber 66 which surrounds pipe 86. This vent chamber is connected by a pipe 67 to the upper part of the liquid-recovery chamber 12. Also connected to the upper part of chamber 12 (Fig. 10) is a pipe 68 which extends to a suitable location within the pump casing and provides a continually open vent from the chamber 12 to the atmosphere. The bottom wall of chamber 12 consists of a flange 69 formed on the pump body 8. The casting 11 is secured to this flange by cap screws 70. In this flange 69 is a passage 71 which connects chamber 12 to the inlet passage 42 of the pump. A valve 72, actuated by a float 73, controls the passage 71, opening the same when liquid accumulates in chamber 12 above a predetermined level and closing the same when liquid falls to such level.

The top of the separator (Figs. 3b and 6b) is provided with a flange 74 which surrounds vent chamber 66 and to which there is fastened, as by bolts 75 (see Fig. 9) a flange 76. This flange (Fig. 6b) has upstanding centrally therefrom a hollow cylindrical post 77. The flange 76 and post 77 close the upper end of vent chamber 66 and form the top wall of a turret-supporting standard. In flange 76 is a ball race 78 (Fig. 9) surrounding the post 77, and containing balls 79 (Fig. 6b) on which rests the base 80 of a turret. The latter has a drum portion 81 and a separable top wall 82, secured to the drum as indicated in Fig. 3b. On wall 82 is a flange 83 (Fig. 6b) to which is secured a displacement meter 84, having its inlet in communication with a chamber 85 in flange 83. Secured to the latter and communicating with chamber 85 is a hollow shaft 86 which passes downwardly through the top wall of the standard—that is post 77 and flange 76—and is rotatably engaged in upper and lower sleeve bearings in the post, as indicated. This shaft passes through vent chamber 66 and the cover or upper wall 64 of the separating chamber 46, and has fixed to its lower end the outlet pipe 63. No stuffing box or other sealing means is required for shaft 86 and it has merely a running fit in the cover 64. The clearance space between the shaft and the cover form part of the constantly open outlet from the separating chamber 46 into vent chamber 66, the other part being holes 65.

The meter-supporting flange 83 (Fig. 3b) extends outwardly on opposite sides to support the lower ends of a bracket 87, each end being secured to the flange by a bolt 88. This bracket 87, as best shown in Fig. 3a, supports a base plate 89, which is secured thereto by bolts 90 and which supports the registering mechanism. The latter, as shown, is of the well known computor type, designed to compute and to indicate the cost, as well as show the quantity of the liquid dispensed. The registering mechanism proper is contained in a casing 91, while the change-gear driving mechanism is contained in the underlying cylindrical casing 92. The meter driving shaft 93 is connected by a flexible coupling 94 to the driving shaft 95 of the registering mechanism.

The upper casing section C is conveniently made in two halves, as indicated in Fig. 2, with overlapping edges which are secured together by screws 96. Some of these screws are threaded into brackets 97 which are secured by bolts 98 to the register-supporting brackets 87, as best shown in Figs. 3a and 3b.

The turret also carries a hose reel (Fig. 6b). A portion of the drum 81 of the turret also serves as the drum portion of the hose reel. The reel has upper and lower side plates 99 and 100, respectively, both of annular form. The upper plate 99 is secured to an annular ring 101 which is secured by screws 102 to the top wall 82 of the turret. The lower side plate 100 is fixed to an annular ring 103 which is fixed by set screws 104 to drum 81. The lower side plate is thus adjustable for a reason later to appear. Secured by bolts 105 (Fig. 3b) to a pair of lugs 106, upstanding from the top wall 82 of the turret, is a special double-elbow fitting 107, which has one outlet turned vertically upward for connection to a pipe 108 which connects with the outlet of the meter 84, and another outlet located inside drum 81 and turned more or less tangentially (see Fig. 8) with respect thereto and connected to the inner end of the hose 1. The drum 81 is cut away (Fig. 8) to allow the hose to pass through it to the outer periphery of the drum on which it is wound. As shown, there are two and a fraction convolutions of the hose 1 wound on the reel.

The turret is provided with a spiral spring 109 (Figs. 3b and 8) for returning it to a predetermined initial position. One end of the spring is fixed to a stud 110 upstanding from the upper face of the bottom wall 80 of the turret. The other end of the spring is formed into a cylinder 111 which is received in a recess in the post 77. The spring is covered by a casing 112 (Fig. 6b) fixed to post 77. As will be clear from Fig. 8, a pull on the exposed end of hose 1 will turn the hose reel and the turret in a counterclockwise direction and wind up spring 109. Also, when the hose is released, the spring will turn the reel and turret in a clockwise direction and wind up the hose.

The hose 1, on leaving the reel, passes outside the pump casing through the described tangentially-directed outlet 7 (Fig. 8) in the intermediate section D. Mounted on trunnions 113 fixed in the outlet 7 is a cup-shaped casing 114 having a central opening through which the hose passes. Inside the casing 114 are a plurality of balls 115 which engage the hose. These balls are held in place by a cover 116 for the cup. The arrangement thus provides an anti-friction guide for the hose and one which can swivel in the outlet 7. Fixed on the hose 1 is a rubber bumper 117 adapted, when the hose is wound up, to engage the cover 116 and arrest the reel without shock at the end of its winding-up movement.

Figure 8:
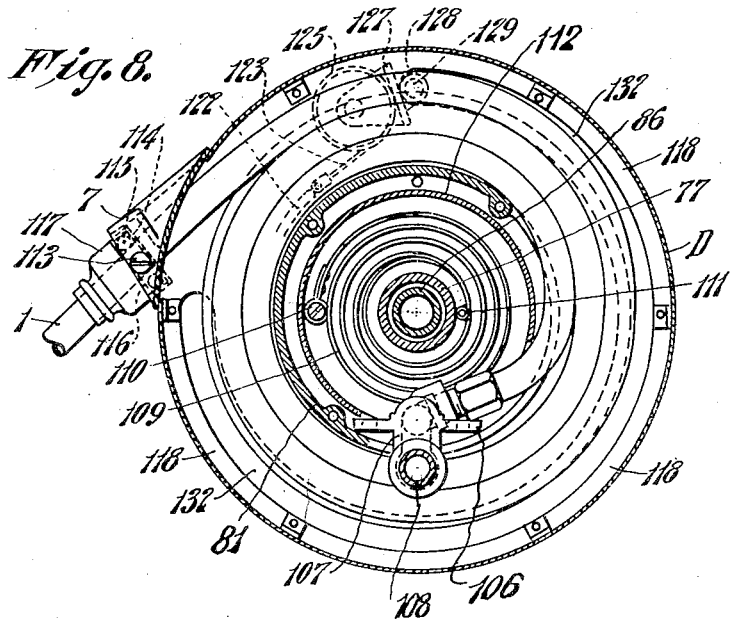
Figure 13:
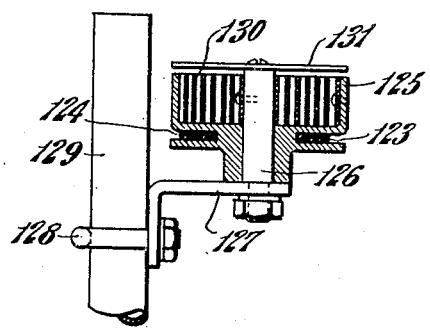
Fig. 13 is a sectional elevational view of the turret-returning means.

The intermediate section D is fixed, as indicated in Fig. 6b, to an annular plate 118. This plate, in turn, is fixed by screws 119 (Fig. 3b) to an annular ring 120, which is rotatably mounted on the lower part of the drum 81 of the turret and which is supported by a shoulder 121 thereon. Thus, the casing D is mounted coaxially of and on the turret for rotation independently thereof. The ring 120 is provided with a pulley groove 122 (Fig. 6b), to which one end of a flexible cable 123 is connected. The other end of this cable is fixed to a pulley 124, formed on the lower part of a casing 125. This casing, as shown in Fig. 13, is rotatably mounted on a stud 126, fixed to an angle bracket 127, held by a U-bolt 128 to a fixed upstanding post 129. The upper part of casing 125 is cup-shaped and houses a spiral spring 130, one end of which is fixed to the casing and the other end to stud 126. A cover 131 for casing 125 is fixed to the top of stud 126 and overlies and covers the spring 130. The plate 118 (Fig. 8), which supports the intermediate section D, has an arcuate slot 132 therein and pipe 129 extends through this slot and limits the extent of movement of the plate and section D to about 270 degrees. When the section D is turned in a counterclockwise direction, the pulley 122 turns with it and pulls on cable 123, unwinding the latter from pulley 124. When the section D is released, spring 130 turns pulley 124, winding up the cable 123 and turning pulley 122 clockwise until it is arrested by the pipe 129 abutting one end of slot 132 as shown in Fig. 8.

Figure 9:
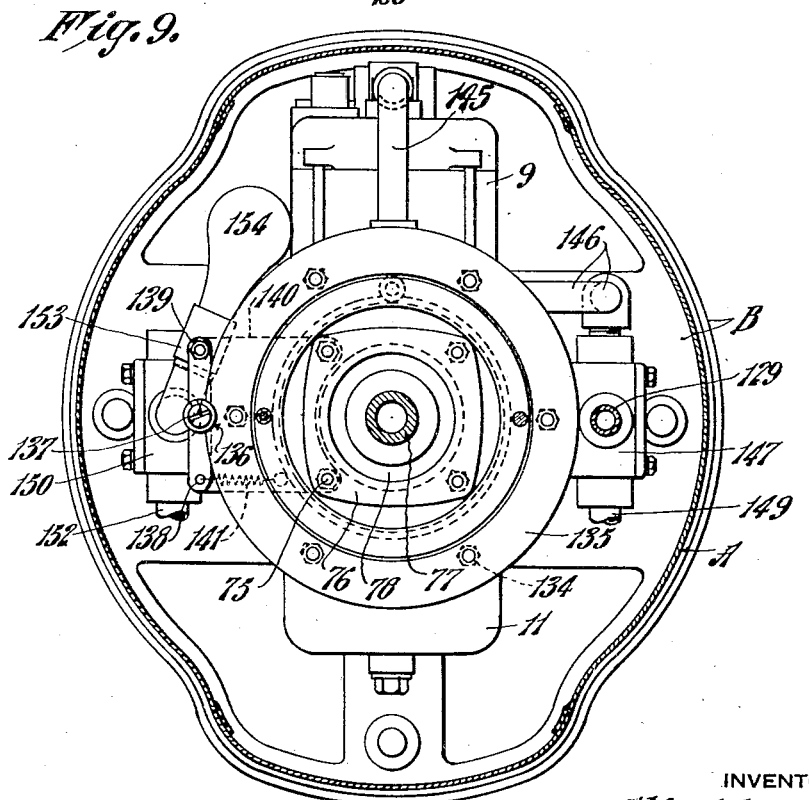

Depending from the bottom wall 60 of the turret (Fig. 6b) is an annular flange 133, to which is secured by cap screws 134 a ring 135. This ring (Fig. 9) has a notch 136 therein. Partially engaged in this notch is a roll 137, mounted on an arm 138, intermediate the ends of the latter. Arm 138 is pivotally mounted at one end on a stud 139, fixed to a plate 140. This plate is secured to flange 74 by two of the described bolts 75 which serve to clamp this flange and the described flange 76 together. A spring 141 connects the other end of arm 138 to plate 140, as shown in Figs. 9 and 6b. The roll 137, when engaged in notch 136, serves to hold the turret in its initial position, as herein illustrated. The roll also serves to hold the turret in either of two other positions, viz., that which the turret occupies when the hose reel has been turned one revolution and that which the turret occupies, when the reel has been turned two revolutions. The roll will not engage in the notch and stop the turret and hose reel unless the latter are travelling very slowly at the time when the notch 136 approaches the roll. Thus, when the operator wishes to wind up the hose, he simply relaxes his grip on the hose and allows it to turn back to its initial position and, if the reel has been turned more than one revolution, the notch 136 will pass roll 137 without difficulty. The bumper 117 on hose 1 will engage the cover 116 of the hose guide at the end of outlet 7 and slow up the reel and turret so that the roll 137 engage in notch 136 at the initial position of the turret. And, if the operator wishes to hold the turret and reel, after having unwound one or two convolutions of the hose, he can do so by causing the reel to turn slowly when notch 136 is approaching roll 137.

Figure 11:
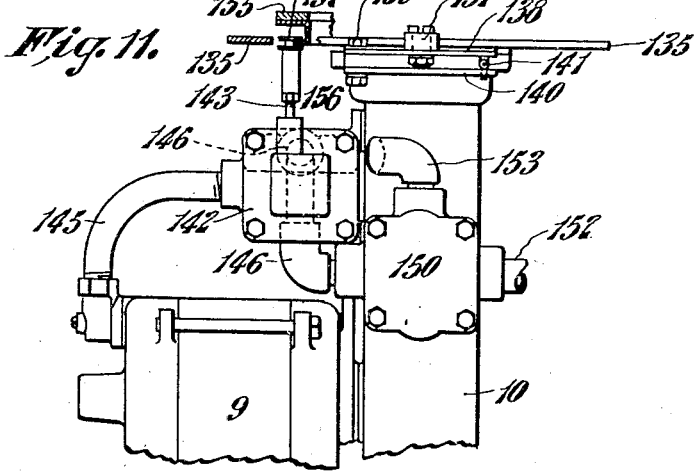
Fig. 11 is a fragmentary exterior elevational view, taken in the same direction as Fig. 3b and showing the operating mechanism for the switch of the motor.

The electric motor 9 is controlled by a switch mounted inside a box 142 (Fig. 3b) and operable by a rod 143. When the rod is positioned as shown the switch is closed. When the rod is lifted, the switch is open. The box 142 is secured by screws 144 to the back wall of separator casing 10. A conduit 145 connects the switch box and motor casing 9. A conduit 146 connects the switch box 142 to a side outlet of a junction box 147 (Figs. 6b and 7), fixed by screws 148 (Fig. 6b) to one side wall of separator casing 10. This box also serves to support the described pipe 129 which is associated with the return mechanism for casing D. Box 147 has a conduit shown in part at 149 for receiving wires from a power supply source of electricity. On the opposite side wall of separator casing 10 is a junction box 150 which is secured thereto by screws 151. This box 150 in Fig. 11 is directly in front of box 147 and hides the latter from view. A conduit, shown in part at 152, connected to a side outlet of box 150 is adapted to receive wires leading from a suitable lighting source of electricity. Connected to the top outlet of box 150 is a socket 153 for an electric lamp 154 (Fig. 6b).

For actuating the switch rod 143 from the lever 4 on the rotatable casing C, regardless of the position of the casing C, the following mechanism is provided. An annular ring 155 (Fig. 3b) has fixed thereto an annular track 156, which is engaged in the groove of a clutch collar 157, fixed on the upper end of the switch rod 143. Fixed to ring 155 (Fig. 6b) is a rod 158, which is slidably engaged in a sleeve 159, fixed in the bottom wall 60 of the turret, and extending upwardly inside the same. At a diametrically opposite point on ring 155 is fixed a longer rod 160 which extends upwardly through the turret and above the top wall thereof. The rods 158 and 160 have lower ends which are shouldered down and threaded. These ends pass through the ring 155 and the support for track 156 and are clamped together by nuts 161 on said threaded ends. The rod 158 guides the track 156 and the rod 160 lifts it. Fixed to the upper end of rod 160, as by a screw 162 (Fig. 14) is a clevis 163 and mounted to turn in the clevis is a pin 164 to which the lower end of a rod 165 is fixed, as by the screw thread connection shown. Fixed, as by screws 166, to the plate 89 is a bracket 167 which has spaced hubs 168 in which a shaft 169 is mounted. Shaft 169 pivotally supports the switch lever 4. Pivotally connected at its upper end to the switch actuating lever 4 is a rod 170. The rods 165 and 170 are adjustably connected by a strap 171. At the ends of this strap are oppositely turned ends 172, through one of which rod 170 passes and through the other of which rod 165 passes. Intermediate its ends, the strap has struck out therefrom oppositely-turned lugs 173, to which the adjacent ends of rods 165 and 170 are severally fixed as by the nuts 174 shown. The arrangement enables the effective length of the connection between lever 4 and clevis 163 to be varied as desired. This connection is guided for vertical movement in two vertically spaced lugs 175 on the bracket 167. The extent of movement of switch lever 4 is controlled by a lug 176 (Fig. 6a) on the inner end thereof, which lug engages in a notch 177 in a flange 178, formed on one of the hubs 168. Lug 176 is free to move between the two radial walls of notch 177 and is adapted by abutment with such walls to limit the swinging movement of lever 4.

This lever 4 is interlocked with the register-resetting crank 5, by means of the following mechanism. The crank 5, as shown in Fig. 3a is fixed to a spindle 179 which has a pin and slot connection with one end of the reset shaft 180 of register 91. The opposite end of shaft 180 has a pin and slot engagement with a member 181, rotatably supported in a bracket 182, fixed to and upstanding from plate 89. A corresponding member 183 is fixed to a short shaft 184. Fixed on the end of switch shaft 169 (Fig. 7) is a lever 187 which has a pin and slot connection (Fig. 6a) with the lever 186.

Cooperating with the members 181 and 183 is a dog 188 (Figs. 4, 5 and 7), which is pivoted on a stud 189, fixed to the bracket 182 and which is movable between the two extreme positions shown in Figs. 4 and 5. In Fig. 4, the lower end of dog 188 engages a shoulder 190 on member 183 and prevents movement of the same in the clockwise direction necessary to enable lever 4 to be turned clockwise and start the pump motor. Thus, the latter cannot be started until the crank 5 has been turned to reset the register 91 to zero. When the dog 188 is moved to its Fig. 5 position, the member 183 is unlocked while the member 181 is locked by the engagement of a tooth 191 in a notch 192 of member 181. The switch lever 4 may now be turned to "on" position but the reset shaft 180 is locked against movement, whereby resetting of the register cannot occur during operation of the pump.

The dog 186 is moved from one to the other of its two extreme positions by toggle mechanism. A toggle link 193 is pivotally mounted at one end on a stud 189 to swing independently of dog 188 and at its other end is pivoted to one end of a second toggle link 194. The lower end of the latter is slidable in a lug 195 on bracket 182. A spring 196, coiled around link 194, tends to hold the toggle links in their extreme positions and to assist in moving them from one position to the other. On the link 193 are two pins 197 which project outwardly in underlying relation with dog 188. These pins are moved by cams 198 and 199 on the members 181 and 183, respectively. The cam 198, when turned counterclockwise as viewed in Fig. 4, will engage the right hand pin 197 and move it and the toggle links until these links cross the line of centers which interconnects the pivot points of these links, whereupon the spring 196, which has been stressed by the described movement of the links, will expand and move them into the extreme position shown in Fig. 5. During this movement, the left hand pin 197 will engage the dog 188 and move it to the position shown in Fig. 5. With the parts in the Fig. 5 position, rotation of cam 199 clockwise will engage the left hand pin 197 and move it and the toggle links to the right until the links cross the aforesaid line of centers, whereupon spring 196 will complete the movement and cause the right hand pin 197 to engage dog 188 and move it to the Fig. 4 position. Movement of member 183 is limited by two lugs 200 on the member which lugs are adapted to engage a stop 201 on bracket 192.

The particular type of register used herein is so constructed that the resetting shaft 180 must be turned 405 degrees in a counterclockwise direction, as viewed in Figs. 4 and 5. When thus turned and released, the shaft will move back 45 degrees in a clockwise direction and come to rest. The net result is one complete revolution of member 181. However, the tooth 191 would, unless otherwise restrained, move into notch 192 at the end of 360 degrees movement in a counterclockwise direction, and prevent the desired further movement of 45 degrees. To avoid such action, the following means are employed. A disk 202 (Fig. 7) is mounted on the stud 203, which carries member 181, and a star-shaped spring 204 on said shaft presses this disk against a friction washer 205 and the latter against member 181. Disk 202 carries an ear 206 which can move in under the arc-shaped surface 207 (Fig. 4) on dog 188. Such surface is coaxial with member 181 and ear 206, when the dog is in the Fig. 4 position. On the initial movement of member 181 in a counterclockwise direction, ear 206 will move under surface 207 until it abuts tooth 191. The ear 206 will then have moved 45 degrees and come into position to support dog 188 when required. On continued movement of member 181 in the counterclockwise direction, ear 206 remains stationary. During this movement, cam 198 will engage the right-hand pin 197 on toggle link 188 and move the links to the left across their line of centers, after which spring 196 will move the links still further to the left and nearly into the position shown in Fig. 5 in readiness to move dog 188 when the latter is released from ear 206. The notch 192 is carried 45 degrees in a counterclockwise direction beyond tooth 191. Then, on the return 45 degree movement, the member 181 and ear 206 will move together and, at the moment when notch 192 moves into line with tooth 191, the ear 206 will have moved out from under the end of dog 188. The latter, being thus released, will be moved by the toggle spring 196 into the position shown in Fig. 5, thus unlocking the switch lever for movement and locking the resetting mechanism against movement. Lever 4 can then move. Movement of lever 4 will turn member 183 in a clockwise direction until the right-hand lug 200 abuts stop 201. In the course of this movement, cam 199 will move the toggle links across their line of centers and spring 196 will move them the rest of the way into position to swing dog 188 in a counterclockwise direction. However, the notch 199 will have been moved beyond the left-hand end of dog 188 and such end will ride on surface 208 of member 183 and thus be held against clockwise movement. When, however, the switch is turned off, member 183 will be turned counterclockwise and, as soon as notch 190 comes into line with the left-hand end of dog 188, the latter moves into the notch to lock the switch and unlock the resetting mechanism.

The lower casing A is conveniently made in four sections (Fig. 1). There are two sections 209, having fixed thereto brackets 210, which are secured as by bolts 211 to base B. There are two sections 212, each overlapping the edges of two sections 209 and being suitably secured thereto as by screws 213. By removing these screws 213, either section 212 or both sections 212 may be removed to gain access to the mechanism housed in casing A.

Figure 6A:
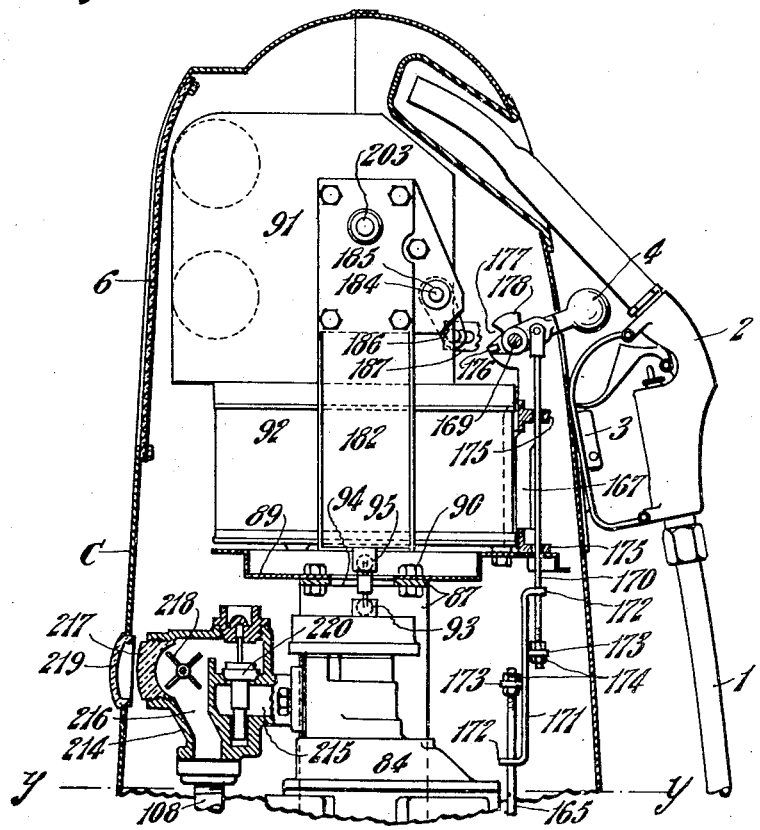
Figure 7:
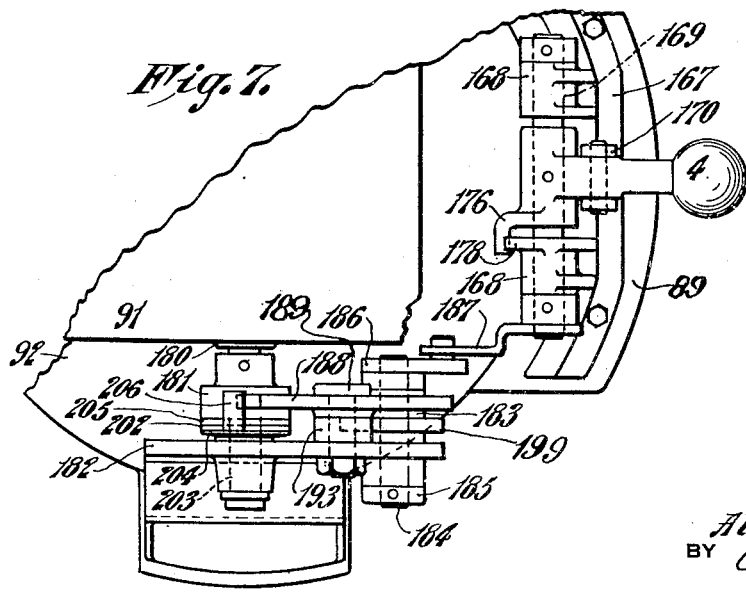

It is usual to interpose in the discharge line of the apparatus a so-called visible discharge indicator. It is also usual to interpose in such line a check valve, having therein an expansion relief valve. These elements are all provided in a single casing 214, fixed, as indicated in Fig. 6a, to the meter casing 84 with its inlet passage 215 in communication with the outlet of the meter and its outlet passage 216 connected to the described discharge pipe 108. In the discharge passage is a window 217 and in back of this window and rotatably mounted in casing 214 is a spinner 218, movable by the liquid as it flows outwardly from the meter to the hose. In line with window 217, is a window 219 in casing C, so that movement of the spinner may be readily observed by the operator and customer. The construction is shown in more detail in Fig. 15.

At the junction of the passages 215 and 216 (Fig. 15) a seat is formed for a check valve 220 which opens outwardly in the direction of the dispensing flow and closes to prevent return flow. A relatively light spring 221 holds valve 220 to its seat until a small pressure has been built up. Fixed as indicated, to the inner face of valve 220 is a tubular stem 222 which at its lower end is slidably mounted in the casing 214 to guide the valve. The lower end of stem 222 is closed and the upper end is open. Slidably mounted in the upper end of stem 222 is a plunger 223, the upper face of which is adapted to engage the lower or inner face of valve 220 as a valve and close a passage 224 which extends through valve 220. A stem 225 extends loosely through passage 224 and has its upper end slidably mounted in casing 214. A spring 226 in stem 222 normally holds valve 223 closed. In the peripheral wall of stem 222, near its upper end, is an opening 227 which communicates with inlet passage 215. It will be clear that when the pressure in outlet passage 216 exceeds a predetermined value, the spring 226 will yield and allow valve 223 to open, whereby liquid may flow back from outlet chamber 216 through passage 224 into the upper end of stem 222 and out through opening 227 into the inlet chamber 215.

The window 6 is a sheet of "Plexiglas"—a transparent plastic material of such a character that when an edge of the sheet is exposed to light the face of the sheet will glow wherever the surface is broken. The inner face of the window is painted black. Then, the areas for the several dial openings of the register 91 are formed by cutting through the paint and slightly into the surface of the window. The desired lettering is also cut through the painted face of the window and into the surface thereof. The advertising sign 228, shown in Fig. 1 in the casing C, may be formed in a similar manner. Light from the electric lamp 154 will reach the lower edge of the window 6 and the several areas and the lettering cut in the inner surface of the sheet will glow and be readily visible at night. The dial readings are easily observed both at day and at night through the cut-out areas and the lettering is also clearly visible at day and at night.

In operation, the handle 5 is turned as described and then released. This operation insures that the dials of the register 91 will be reset to zero and results in unlocking the switch lever 4. The operator then removes nozzle 2 from its support 3, after which he pulls lever 4 downwardly (as viewed in Figs. 2 and 6a) resulting in the lowering of rods 170 and 160 and the track 155 and the depression of switch rod 143, whereby the switch is closed and motor 9 is started and pump 8 driven. The operator then carries nozzle 2 to the tank to be serviced. If the length of hose, which is exposed outside the pump casing is sufficient to reach the tank, the operator fills the tank in the usual way, controlling the flow from the nozzle valve, and when the filling operation is completed, he hangs the nozzle 2 on its support 3, having previously moved lever 4 upwardly to open the switch and stop the pump motor. The switch lever 4 then becomes locked until the register 91 has been reset by crank 5.

If the operator needs additional hose in order to reach the tank to be filled, he simply pulls on the hose causing the reel 81 and the turret, meter and register to turn and the desired amount of hose to be unwound. The first pull on the hose serves to turn casing D until the taut section of the hose lies tangential to the periphery of the reel 81, or, stated another way, until the tangential exit 7 in casing D swings into the line of pull on the hose. Further pulling of the hose turns the reel. If the reel is turned by one or two revolutions, it can be held by the engagement of roll 137 in the notch 136 in the ring 135 of the turret, thus relieving the operator of the necessity of maintaining his pull on the hose during the servicing period.

In any case, the operator can control the location of the dial of the register throughout a range of 360 degrees. If the dial does not face in the desired direction so that he can readily read the indications of the register, while standing near the tank to be filled, he can by a pull on the hose, turn the turret until the dial does face as he desires. It is also possible for the operator to present the dial of the register to the view of the customer, while in the car or elsewhere.

The invention thus offers a dispensing apparatus having an angular service range of 360 degrees and a radial service range which is extensible, whenever desired, within wide limits and, coupled with these features, is the feature of adjustability of the turret to carry the face of the register into the view of the operator or the customer, wherever stationed, within reasonable limits in the vicinity of the dispensing apparatus.

I claim:

1. The combination in liquid measuring and dispensing apparatus, of a standard, a turret supported by the standard for rotation about a vertical axis, a register and a meter for driving the register both carried by the turret, liquid-supply means carried by the standard, connections between said means and meter including an interposed swivel enabling rotation of the meter with the turret, a hose reel fixed to said turret and held against rotation relatively to the turret, a discharge conduit for the meter including a flexible hose wound on said reel, said turret being rotatable by pulling on the hose to unwind the hose from the reel and turn the register for convenient reading, and means automatically operable when the pull on the hose is released for returning the turret and register to initial position and for winding up the hose on the reel.

2. In liquid measuring and dispersing apparatus of the type having a dispensing conduit including a flexible hose, means for creating a flow of liquid through said conduit, a meter interposed in said conduit for measuring the liquid dispensed, and a register driven by the meter and indicating the amount of liquid dispensed; the combination of a casing for housing the aforesaid elements having a stationary lower section, an upper section which is rotatable about a vertical axis and to which said register is fixed, and an intermediate section rotatable about said axis independently of the upper section; a hose reel housed within the intermediate section and connected to turn with the upper section, the intermediate section having an exit opening for the hose located tangentially with respect to the reel, said intermediate section being rotatable by a pull on the hose until its tangential exit swings into the line of pull on the hose, further pulling on the hose serving to rotate the upper section to present the register for convenient reading and to unwind the hose from the reel.

3. The combination in liquid dispensing and measuring apparatus, of a standard, a turret mounted on the standard for rotation about a vertical axis, a meter and a register driven by the meter both fixed to the turret, a hose reel fixed to the turret below the register, a first and stationary casing section housing said standard, a second casing section housing the reel and rotatably mounted on the turret for rotation about said axis, and a third casing section for housing the register and fixed to and rotatable with the turret, the second section having an exit for the hose located tangentially of the reel, said second section being turnable when the hose is pulled until said exit swings into the line of pull on the hose, further pulling on the hose serving to turn the third section and present the register for convenient reading and to unwind the hose from the reel.

4. The combination in liquid dispensing and measuring apparatus, of a standard, a turret mounted on the standard for rotation about a vertical axis, a meter and a register driven by the meter both fixed to the turret, a hose reel fixed to the turret below the register, a first and stationary casing section housing said standard, a second casing section housing the reel and rotatably mounted on the turret for rotation about said axis, and a third casing section for housing the register and fixed to and rotatable with the turret, the second section having an exit for the hose located tangentially of the reel, said second section being turnable when the hose is pulled until said exit swings into the line of pull on the hose, further pulling on the hose serving to turn the third section and present the register for convenient reading and to unwind the hose from the reel, means for returning the third section into a predetermined initial relationship with the first section when the pull on the hose is relaxed, whereby the hose is wound up on the reel, and means for returning the second section into a predetermined initial relationship with the third section when the pull on the hose is relaxed.

5. In a liquid measuring and dispensing apparatus of the type having a dispensing conduit including a flexible hose having a nozzle on its delivery end, means for creating a flow of liquid through said conduit, a meter interposed in said conduit for measuring the liquid dispensed, and a register driven by the meter and indicating the amount of liquid dispensed; the combination of a casing for housing the aforesaid elements having a stationary lower section, an upper section which is rotatable about a vertical axis and to which said register is fixed, and an intermediate section rotatable about said axis independently of the upper section; a hose reel on which a portion of said hose is wound, said reel being housed within the intermediate section and connected to turn with the upper section, the intermediate section having an exit opening for the hose located tangentially with respect to the reel, a support on the upper section for said nozzle, a substantial portion of said hose being hung in a loop outside said casing, said intermediate section being rotatable by a pull on the hose until its tangential exit swings into the line of pull on the hose, further pulling on the hose serving to rotate the upper section to present the register for convenient reading and to unwind the hose from the reel, yieldable means for holding the upper section in a predetermined initial relation with the lower casing, and yieldable means for holding the intermediate section in a predetermined initial relation with the upper casing, said second-named and first-named means being successively yieldable by pulling on the hose and the first-named means serving on release of the pull on the hose to wind up so much of the hose as was unwound from the reel by the pull on the hose.

6. The combination in liquid measuring and dispersing apparatus, of a standard having a chamber therein, liquid-supply means connected to deliver liquid into said chamber, said standard having an upstanding hollow post and a thrust bearing surrounding the base of the post, a turret having a lower wall rotatably supported on said bearing and an upper wall having a downwardly-extending tubular shaft rotatably mounted in said post with its lower end communicating with said chamber, a meter supported by said upper wall and having its inlet connected to the upper end of said tubular shaft, a register driven from and supported by the meter, and a discharge conduit for said meter including a flexible hose by pulling on which said turret may be turned.

7. The combination in liquid measuring and dispensing apparatus, of a standard having a chamber therein, liquid-supply means connected to deliver liquid into said chamber, said standard having an upstanding hollow post and a thrust bearing surrounding the base of the post, a hollow drum-like turret having a lower wall rotatably supported on said bearing and an upper wall having a downwardly-extending tubular shaft rotatably mounted in said post with its lower end communicating with said chamber, a meter supported by said upper wall and having its inlet connected to the upper end of said tubular shaft, a register driven from and supported by the meter, a discharge conduit for said meter including a flexible hose by pulling on which said turret may be turned, and yieldable means located inside the drum-like turret for holding said turret in a predetermined initial position.

8. The combination in liquid measuring and dispensing apparatus, of a standard having a chamber therein, liquid-supply means connected to deliver liquid into said chamber, said standard having an upstanding hollow post and a thrust bearing surrounding the base of the post, a turret having a lower wall rotatably supported on said bearing and an upper wall having a downwardly-extending tubular shaft rotatably mounted in said post with its lower end communicating with said chamber, a meter supported by said upper wall and having its inlet connected to the upper end of said tubular shaft, a register driven from and supported by the meter, a discharge conduit for said meter including a flexible hose by pulling on which said turret may be turned, and a reel fixed to said turret and on which said hose is wound.

9. The combination in liquid measuring and dispensing apparatus, of a standard having a chamber therein, liquid-supply means connected to deliver liquid into said chamber, said standard having an upstanding hollow post and a thrust bearing surrounding the base of the post, a turret having a lower wall rotatably supported on said bearing and an upper wall having a downwardly-extending tubular shaft rotatably mounted in said post with its lower end communicating with said chamber, a meter supported by said upper wall and having its inlet connected to the upper end of said tubular shaft, a register driven from and supported by the meter, a discharge conduit for said meter including a flexible hose by pulling on which said turret may be turned, a reel fixed to said turret and on which said hose is wound; and a casing enclosing the apparatus and including a stationary lower section housing the standard, an intermediate section housing the hose reel and an upper section housing the meter and register and mounted to turn with the turret; said intermediate section being mounted on the turret to turn independently thereof and having an exit opening for the hose located tangentially of the hose reel.

10. The combination in liquid measuring and dispensing apparatus, of a standard having a chamber therein, liquid-supply means connected to deliver liquid into said chamber, said standard having an upstanding hollow post and a thrust bearing surrounding the base of the post, a turret having a lower wall rotatably supported on said bearing and an upper wall having a downwardly-extending tubular shaft rotatably mounted in said post with the lower end of the shaft communicating with said chamber, a meter supported by said upper wall and having its inlet connected to the upper end of said tubular shaft, a register driven from and supported by the meter, a discharge conduit for said meter including a flexible hose by pulling on which said turret may be turned, a reel fixed to said turret and on which said hose is wound; a casing housing the apparatus and including a stationary lower section housing the standard, an intermediate section housing the hose reel and an upper section housing the meter and register and mounted to turn with the turret; said intermediate section being mounted on the turret to turn independently thereof and having an exit opening for the hose located tangentially of the hose reel, yieldable means for holding the intermediate section in a predetermined position relative to the upper section, and yieldable means for holding the upper section in a predetermined position relative to the lower section, both said means being yieldable by pulling on said hose.

11. In liquid dispensing apparatus of the type having a dispensing conduit including a flexible hose, means for creating a flow of liquid through said conduit, a meter interposed in said conduit for measuring the liquid dispensed, and a register driven by the meter and indicating the amount of liquid dispensed, the combination of a casing for housing all the aforesaid elements except the hose, said casing having a lower and stationary section housing said flow-creating means and an upper and rotatable section in which said register is mounted and to which it is fixed, said upper section having a window through which the indications of the register are visible and being turnable from an initial position to various other positions to present the register for convenient reading, a control stationarily mounted within said lower and stationary section for starting and stopping said flow-creating means, and means for moving said control into starting and stopping position, said last-named means including a manually-operable part mounted on the upper casing to turn therewith connecting means between such part and said control operable in any position to which said rotatable upper casing may be moved to enable the control to be moved by said manual part to start and stop the flow-creating means.

12. In liquid measuring and dispensing apparatus, a standard having therein an air separating chamber, a turret supported on the top wall of the standard for rotation about a vertical axis, a register and a meter for driving the register both carried by the turret, a liquid-supply conduit connected to said chamber, a conduit connected to the inlet of the meter and extending coaxially of the turret through the top wall of the standard and the upper wall of the separating chamber downwardly into the latter, said second-named conduit having a free running fit with said walls and the clearance space between such conduit and said upper wall serving as a vent for the separating chamber, said standard having between said walls a vent chamber surrounding the second-named conduit, a liquid-recovery chamber associated with the separator, a conduit connecting said vent and recovery chambers, and a conduit including a hose connected to the outlet of the meter.

13. In liquid measuring and dispensing apparatus, a hollow standard providing within it an air separating chamber, a turret supported on the top wall of the standard for rotation about a vertical axis and having a coaxial pipe rotatably mounted in said top wall and extending through the upper wall of said chamber downwardly into the latter, a meter fixed to the turret and having its inlet connected to said pipe, a conduit including a flexible hose connected to the outlet of the meter, a register carried by the turret and driven by the meter, said standard having between said walls a vent chamber surrounding said pipe, the clearance space between said pipe and upper wall serving as a vent for the separating chamber, a pump fixed to one side wall of the standard and connected to force liquid into the separating chamber, a motor fixed to an opposite side wall of the standard for driving the pump, and a casing having a liquid-recovery chamber connected to receive the discharge from the vent chamber and connected to discharge the recovered liquid to said pump.

ALFRED L. GRISÉ.

REFERENCES CITED

The following references are of record in the file of this patent:

UNITED STATES PATENTS

| Number | Name | Date |
|---|---|---|
| 2,246,951 | Peter | June 24, 1941 |
| 2,340,218 | Grisé | Jan. 25, 1944 |
| 2,341,532 | DeLancey | Feb. 15, 1944 |
| 2,351,331 | Goldberg | June 13, 1944 |